(12) United States Patent
Ishigaki et al.

(10) Patent No.: US 7,074,292 B2
(45) Date of Patent: Jul. 11, 2006

(54) PROCESSES FOR MANUFACTURING BLADE MEMBER OF DEVELOPER QUANTITY CONTROL BLADE

(75) Inventors: Toru Ishigaki, Chiba (JP); Mitsuru Honda, Ibaraki (JP); Kazuaki Iwata, Ibaraki (JP); Naohiko Nakano, Ibaraki (JP); Manabu Takashima, Ibaraki (JP); Satoshi Fukuzawa, Ibaraki (JP)

(73) Assignee: Canon Kasei Kabushiki Kaisha, Tsukuba (JP)

( * ) Notice: Subject to any disclaimer, the term of this patent is extended or adjusted under 35 U.S.C. 154(b) by 316 days.

(21) Appl. No.: 10/251,853

(22) Filed: Sep. 23, 2002

(65) Prior Publication Data

US 2003/0070748 A1 Apr. 17, 2003

(30) Foreign Application Priority Data

Sep. 27, 2001 (JP) ............................. 2001-297210

(51) Int. Cl.
 *B29C 47/004* (2006.01)
(52) U.S. Cl. ................. 156/244.19; 156/247; 156/269; 264/171.23
(58) Field of Classification Search ............. 15/256.61; 399/274, 384; 101/157, 169, 363; 264/216, 264/212; 156/172.19, 244.11
 See application file for complete search history.

(56) References Cited

U.S. PATENT DOCUMENTS

| 3,168,424 | A | * | 2/1965 | Sendor | 156/244.19 |
| 3,892,078 | A | * | 7/1975 | Closson, Jr. | 36/68 |
| 4,329,936 | A | * | 5/1982 | Heist et al. | 118/100 |
| 5,570,166 | A | * | 10/1996 | Ohzeki et al. | 399/270 |
| 5,689,783 | A | | 11/1997 | Sasame et al. | 399/284 |
| 5,776,395 | A | * | 7/1998 | Fujiwara et al. | 264/146 |
| 5,812,918 | A | * | 9/1998 | Nakaue et al. | 399/284 |
| 5,895,150 | A | | 4/1999 | Watabe et al. | 399/284 |
| 5,933,692 | A | * | 8/1999 | Niwano et al. | 399/284 |
| 6,835,267 | B1 | * | 12/2004 | Spain et al. | 156/230 |

FOREIGN PATENT DOCUMENTS

| JP | 9-50185 | | 2/1997 |
| JP | 2001255738 A | * | 12/2001 |
| WO | WO 96/40519 | * | 12/1996 |

* cited by examiner

*Primary Examiner*—Sam Chuan Yao
*Assistant Examiner*—Barbara J. Musser
(74) *Attorney, Agent, or Firm*—Fitzpatrick, Cella, Harper & Scinto

(57) ABSTRACT

A blade member manufacturing process using no mold and a developer quantity control blade manufacturing process using this blade member are disclosed in which a material for the blade member is extruded onto a charge control face face-transferring sheet in a uniform thickness, and solidified to form a layer, and the layer is cut into the shape of a blade member.

4 Claims, 6 Drawing Sheets

PROCESSES FOR MANUFACTURING BLADE MEMBER OF DEVELOPER QUANTITY CONTROL BLADE

BACKGROUND OF THE INVENTION

1. Field of the Invention

This invention relates to a process for manufacturing a blade member of a blade which controls the quantity of a developer used to develop and render visible an electrostatic latent image formed on an image-bearing member, and a process for manufacturing such a blade.

2. Related Background Art

FIG. 1 diagrammatically illustrates a conventional developer quantity control blade 12.

The developer quantity control blade 12 is used in a state that it is brought into pressure contact with a developer-carrying member 14. The developer quantity control blade 12 consists basically of a blade member 10 and a support member 11, and is fastened to a developer container 13 via a fitting member 17.

When such a developer quantity control blade 12 is brought into pressure contact with the developer-carrying member 14, the developer quantity control blade 12 is bent, so that a pressing force F is applied to a developer (not shown) on the developer-carrying member 14 at a contact point 16. Thus, the quantity of the developer carried out of the developer container to the developer-carrying member is controlled (regulated), where a thin layer of the developer is formed and at the same time the developer is provided with stated triboelectric charges (also called "triboelectricity") at the contact zone.

The developer quantity control blade is commonly formed of a rubber plate, a metallic sheet, a resin plate or a laminate of any of these. The developer quantity control blade is made up from a blade member which is brought into pressure contact with the developer-carrying member and a support member which supports this blade member at a preset position. The face of the blade member that is brought into pressure contact with the developer-carrying member has the function to control the triboelectric charges of the developer. Accordingly, this face is also called a charge control face. The surface layer of this charge control face is also called a charge control layer in some cases.

As blade members used for negative-type toners, plate members of urethane rubbers, urethane resins or polyamide elastomers are used, for example. Also, as developer quantity control blades used for positive-type toners, those obtained by laminating a charge-providing layer of charge-controlled silicone rubber or the like to a metallic sheet are used.

With regard to a non-magnetic toner used in the formation of color images, its thin layer must be formed on a developing sleeve or a developing roller because the toner itself does not have any magnetic properties. In this case, as materials used in the charge control layer, they may include urethane rubbers, polyamide resins, polyamide elastomers, silicone rubbers and silicone resins. The charge control face is finished with good precision.

In recent years, fine-particle toners are used in developing assemblies realizing high-quality and full-color in which an electrophotographic process is applied, and hence the toners are required to be more uniformly pressed against, and made stick to, the developing sleeve or developing roller. However, especially because of the influence of the surface roughness of the charge control face, faulty images such as uneven images and lines may occur.

Japanese Patent Application Laid-open No. 09-050185 discloses a blade member made of a polyamide elastomer or a polyamide resin, used for negative-type toners. As a manufacturing method, a method making use of a mold having a mirror face is disclosed. Also, in blade members made of urethane rubbers, an example is reported in which the charge control face is similarly formed by mold face transfer. However, where the method disclosed in this publication is employed, the surface properties of the charge control face are influenced by how the mold mirror face is maintained and controlled, and there is a possibility of resulting in non-uniform product quality depending on how it has been controlled.

Also with respect to positive-type toners, how the mold mirror face is maintained and controlled is also an important quality control item in developer quantity control blade members made of thermosetting silicone rubbers or urethane rubbers.

Also in respect of positive-type toners, how the mold mirror face is maintained and controlled is also an important quality control item in developer quantity control blade members made of thermosetting silicone rubbers or urethane rubbers.

SUMMARY OF THE INVENTION

Accordingly, an object of the present invention is to provide a blade member manufacturing process not making use of any mold.

Another object of the present invention is to provide a developer quantity control blade manufacturing process not making use of any mold.

A first embodiment of the blade member manufacturing process according to the present invention is a process comprising the steps of:

extruding a material for a blade member onto a charge control face face-transferring sheet in a uniform thickness, followed by solidification to form a layer; and cutting the layer to have the shape of a blade member.

A second embodiment of the blade member manufacturing process according to the present invention is a process comprising the steps of:

co-extruding a molten resin for forming a charge control face face-transferring sheet and a molten resin for forming a blade member, followed by shaping into a cylinder by multi-layer blown-film extrusion (or inflation method);

cutting the cylinder in parallel to the direction of extrusion to form at least one multi-layer sheet having a blade member resin layer; and cutting the multi-layer sheet at least at the blade member resin layer into the shape of the blade member.

A first embodiment of the developer quantity control blade manufacturing process according to the present invention is a process comprising the steps of:

extruding a material for a blade member onto a charge control face face-transferring sheet in a uniform thickness, followed by solidification to make a blade member;

laminating a supporting member to the blade member on the side not serving as the charge control face, to form a laminate; and cutting the laminate to have the shape of a developer quantity control blade as a final shape.

A second embodiment of the developer quantity control blade manufacturing process according to the present invention is a process comprising the steps of:

co-extruding a molten resin for forming a charge control face face-transferring sheet and a molten resin for forming a blade member, followed by shaping into a cylinder by multi-layer blown-film extrusion;

cutting the cylinder in parallel to the direction of extrusion to form at least one multi-layer sheet;

laminating a supporting member to the multi-layer sheet on the side with the blade member, to form a laminate; and cutting the laminate to have the shape of a developer quantity control blade as a final shape.

In the blade member manufacturing process and developer quantity control blade manufacturing processes according to the present invention, the charge control face of the blade member is endowed with its surface properties by means of the face-transferring sheet so that a blade member and a developer quantity control blade which have a good productivity and also have a good triboelectric chargeability can be obtained without use of any mold.

BRIEF DESCRIPTION OF THE DRAWINGS

FIG. 2A is a top plan view, FIG. 2B is a sectional view, and FIG. 2C is a bottom plan view.

DESCRIPTION OF THE PREFERRED EMBODIMENTS

Figure 1:
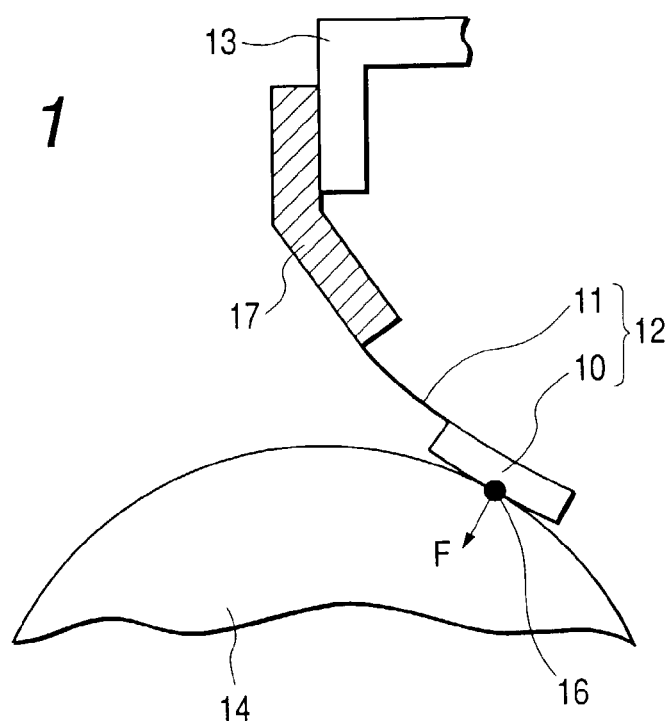
FIG. 1 is a diagrammatic sectional view to illustrate a developer quantity control blade.

With the first-embodiment blade member manufacturing process according to the present invention, in the step of cutting the solidified layer to have the shape of a blade member, cutting may be carried out before or after the face-transferring sheet has been peeled from the solidified layer. Also, as shown, e.g., in FIGS. 2A to 2C, a blade member 30 may also be joined to a support member 31 to form a blade, where the face-transferring sheet may be peeled after the blade member has been joined to the support member.

In the second-embodiment blade member manufacturing process according to the present invention, too, the face-transferring sheet may be peeled from the blade member resin layer at either time before or after the blade member resin layer is cut to have the shape of a blade member. The face-transferring sheet may also be peeled after the blade member has been joined to the support member.

There are developer (toner) particles between the blade member and the developer-carrying member. Where the blade member has a too small thickness, the blade member, which is richer in variability, has a possibility of being forced back. On the other hand, where the blade member has a too large thickness, there is a possibility that any repulsion attributable to the toner particles is so insufficient that any sufficient charging can not be performed.

In addition to the thickness of the blade member, the behavior of pressure contact of toner is also influenced by the elasticity of the blade member, the thickness of the support member and the rigidity of the support member. Similarly, the total thickness of the developer quantity control blade is also an important factor.

From the foregoing viewpoints, in order to achieve a sufficient function as the blade, the blade member may preferably have a thickness of 1 μm or more, and more preferably 10 μm or more. It may also have a thickness of 50 μm or more, or may have even a thickness of 100 μm or more. On the other hand, in order to achieve appropriate contact, to charge the developer particles uniformly and to keep the blade from wearing, the blade member may preferably have a thickness of 300 μm or less, more preferably 100 μm or less, and still more preferably 50 μm or less.

Also from the like viewpoints, the support member may preferably have a thickness of 50 μm or more, more preferably 80 μm or more, still more preferably 90 μm or more, and most preferably 100 μm or more. On the other hand, it may preferably have a thickness of 150 μm or less.

Further from the like viewpoints, the total thickness of the developer quantity control blade may preferably be the sum of the blade member thickness described above and the support member thickness described above, e.g., preferably from 51 μm or more to 450 μm or less.

Still further from the like viewpoints, the blade member may preferably be made from urethane rubber, polyamide resin, polyamide elastomer, silicone rubber, silicone resin or the like, and the support member may preferably be made of a metal flat sheet or a resin flat sheet, and stated more specifically, a stainless-steel sheet, a phosphor bronze sheet, an aluminum sheet or the like. Also, in order to achieve any desired charging performance and so forth, an additive such as a conductive material may be added to the above chief materials for the blade member. Still also, the support member and the blade member may be joined by, e.g., bonding with an adhesive such as a hot-melt adhesive.

In a preferred embodiment of the first-embodiment developer quantity control blade manufacturing process according to the present invention, the blade can be manufactured in a good precision and a good productivity by extruding the material for the blade member onto a charge control face face-transferring sheet in a uniform thickness, followed by solidification to make a blade member; laminating the supporting member to the blade member on the side not serving as the charge control face, to form a laminate; and cutting the laminate to have the shape of the developer quantity control blade as a final shape, by means of a press and a cutter.

Figure 5A:
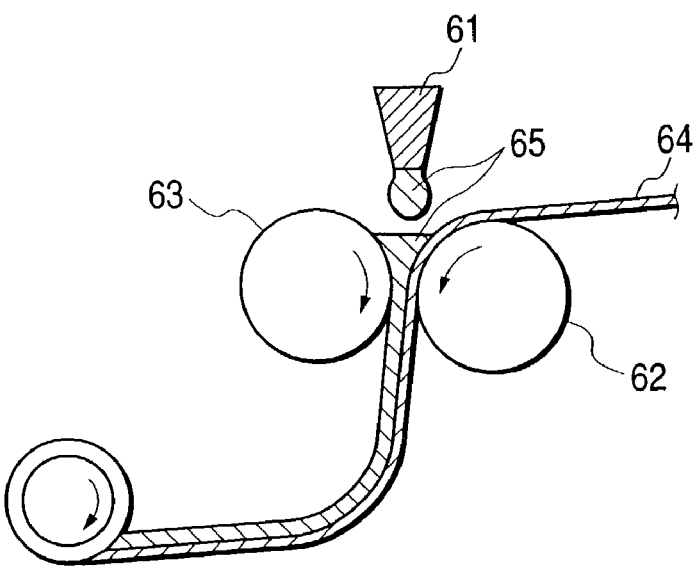
FIGS. 5A and 5B are diagrammatic sectional views to illustrate a developer quantity control blade manufacturing process of the present invention.

As a preferred embodiment of the first-embodiment blade member manufacturing process according to the present invention, an example of a blade member manufacturing process which utilizes roll coating is shown in FIG. 5A. First, a face-transferring sheet 64 is set on a roll 62. A material 65 for the blade member is injected and fed from a nozzle 61, and is passed through a gap between rolls 62 and 63 which has been adjusted to a preset space. Thereafter, the material 65 is solidified by drying. Thus, a blade member is obtained which has been covered with the face-transferring sheet on the charge control face side.

Here, the surface of the roll 63 positioned on the side of the material 65 for the blade member may preferably be a rough surface.

More specifically, the surface of the roll on the side opposite to the face-transferring sheet and coming into contact with the material for the blade member is made rough. In this case, of both sides of the blade member obtained, the side to which the support member is to be bonded is made rough. As a result, the blade member can have a larger contact area surface on that side, and also, because of an anchor effect, a great adhesive force can be obtained between the blade member and the support member. From such a viewpoint, the rough surface may preferably have a ten-point average roughness (Rz) of 1.5 µm or more.

The rough surface of that roll may be formed by embossing with various types of patterns, or by scratch patterning. Such a surface may be obtained by etching or mechanical surface-roughening. Also, it is preferable to avoid any surface-roughening that may affect the surface properties of the blade member on the side of the face-transferring sheet (charge control face), and the rough surface may preferably have a ten-point average roughness (Rz) of 5.0 µm or less.

Such a rough-surface roll is not necessarily required to be metallic, and any heat-resistant material may suffice. For example, it is effective to use a silicone rubber roll subjected to surface-roughening treatment. A ceramic material may also be used, which may be provided with a reinforcing coating on its surface if there is concern about brittleness.

As the face-transferring sheet, a film formed of a polyester resin, a polyamide resin, a polyolefin resin, a copolymer of any of these or an alloy of any of these may be used. In particular, a film formed of at least one selected from polyethylene terephthalate, polyethylene-2,6-naphthalate and a copolymer or composite of these is preferred.

To the blade member thus obtained, after an adhesive coating has been formed on its surface opposite to the side covered with the face-transferring sheet, the support member is bonded to make up a laminated structure. Then, the laminate thus obtained is cut into a stated shape by, e.g., press cutting.

The blade member and the support member which have been bonded together may be heated to achieve much higher adherence.

Figure 5B:
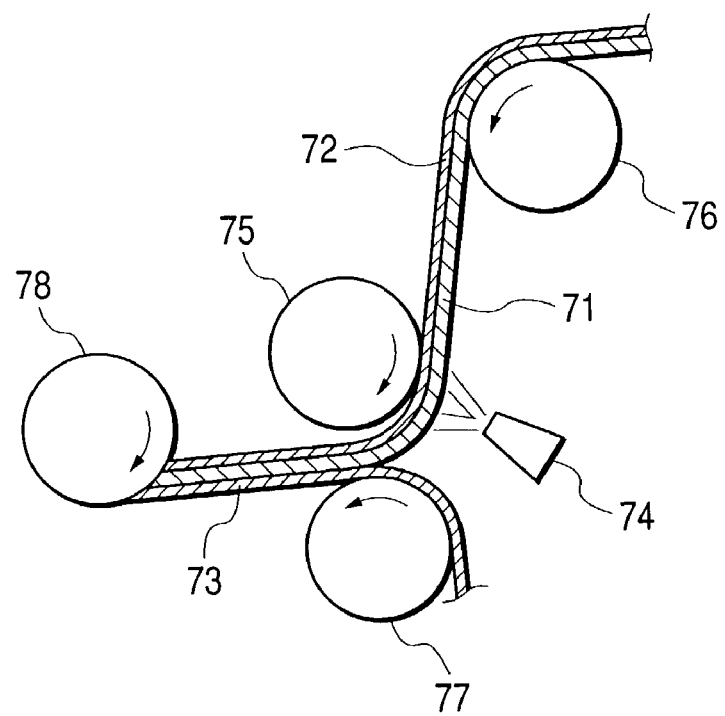

The blade member and the support member may also continuously be bonded together by means of an apparatus as shown in FIG. 5B. More specifically, a multi-layer sheet consisting of a blade member 71 and a face-transferring sheet 72 is fed to a roll 75 via a roll 76, and an adhesive is applied by a spray coater 74 on the blade member 71 on its side to which the support member is to be bonded. Thereafter, feeding a support member 73 through a roll 77, the support member 73 is bonded to the blade member 71, and the laminate thus obtained is wound up on a roll 78.

In the manufacturing process described above, differently from blade members formed by means of a mold, the material for the blade member is accumulated on the face-transferring sheet, and the face-transferring sheet face is replicated to the blade member.

In the case when a mold face is replicated, the surface state is brought into a mirror face by, e.g., polishing and buffing. However, it may be necessary to go through many steps until the presence of any microscopic unevenness and grooves or the like have come to be no problem. In contrast thereto, in the case of the face-transferring sheet, the flatness (as Rz, preferably 3.5 µm or less, more preferably 1.0 µm or less, and still more preferably 0.3 µm or less) necessary for the charge control face can be achieved with ease. As a result, the developer quantity control blade can be manufactured with good precision and good productivity.

For the fine structure of the charge control face, it is important to be smooth. Even if its roughness is measured as a relatively large numerical value in a macroscopic view, the charge control face may suffice as long as it is smooth in a microscopic view. More specifically, even if it has a macroscopic roughness of 2 to 4 µm, a satisfactory effect is expected under a roughness profile having a relatively large amplitude, as long as it has a roughness of 0.5 µm or less, preferably 0.4 µm or less, and more preferably 0.3 µm or less, in its fine structure.

In a preferred embodiment as the second-embodiment developer quantity control blade manufacturing process according to the present invention, the blade can be manufactured with good precision and good productivity by co-extruding a molten resin for forming a charge control face face-transferring sheet (hereinafter "face-transferring sheet molten resin") and a molten resin for forming a blade member (hereinafter "blade member molten resin"), followed by shaping into a cylinder by multi-layer blown-film extrusion; cutting the resultant cylinder in parallel with the direction of extrusion to form at least one multi-layer sheet; laminating the supporting member to the multi-layer sheet on the side with the blade member, to form a laminate; and cutting the laminate to have the shape of the developer quantity control blade as a final shape.

Figure 6:
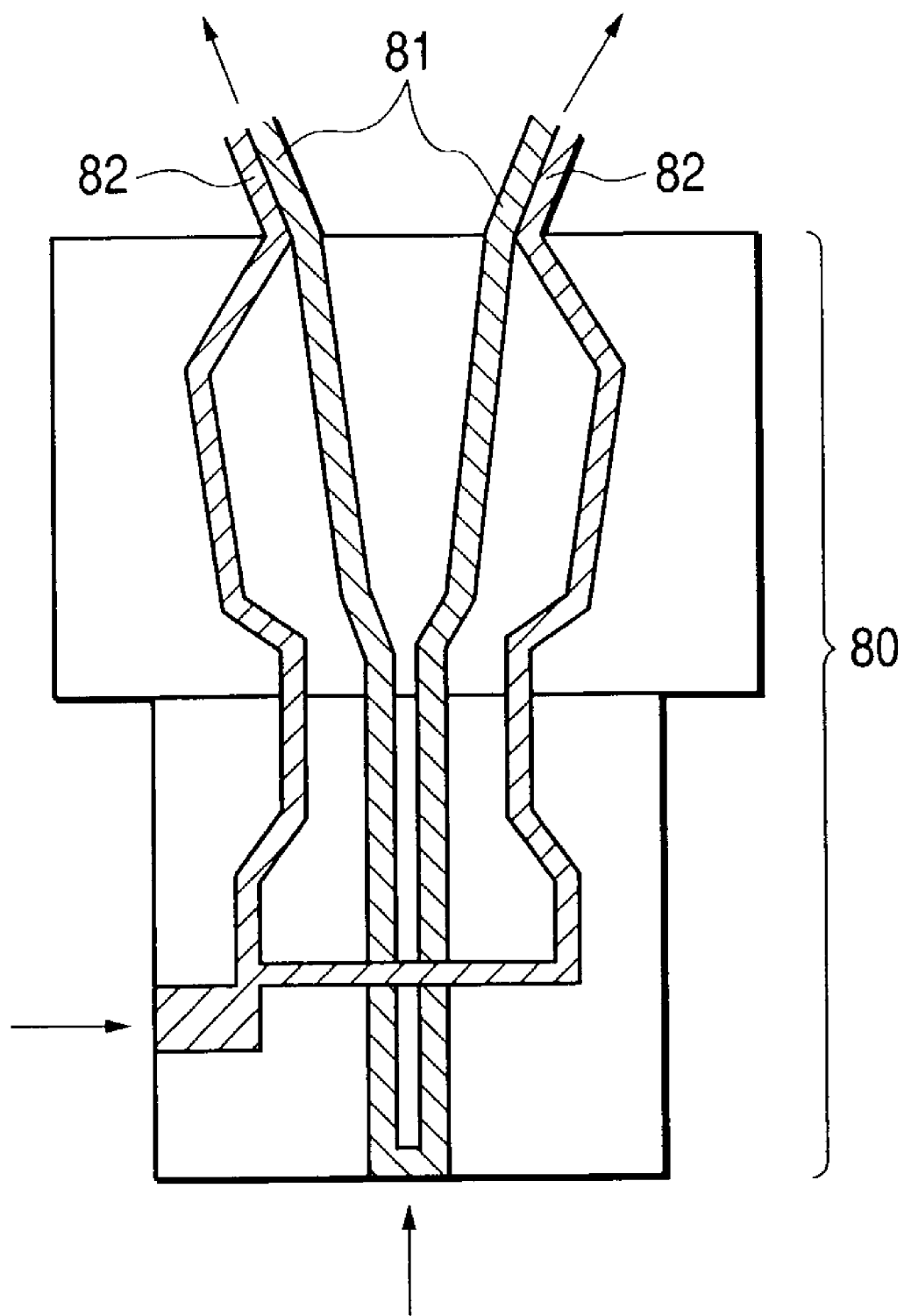
FIG. 6 is a diagrammatic sectional view to illustrate the structure of a circular die.

For example, as shown in FIG. 6, a face-transferring sheet molten resin 82 and a blade member molten resin 81 are co-extruded from a circular die 80 in a cylindrical shape. Thereafter, as shown in FIG. 7A, air is blown into the cylindrical extruded product to blow up the same, which is then drawn up closing its upper part and then, e.g., cut with a cutter 83 into two sheets to obtain multi-layer sheets. Here, it is preferable for the cylindrical product to be so formed that its outer layer is the face-transferring sheet.

Figure 7B:
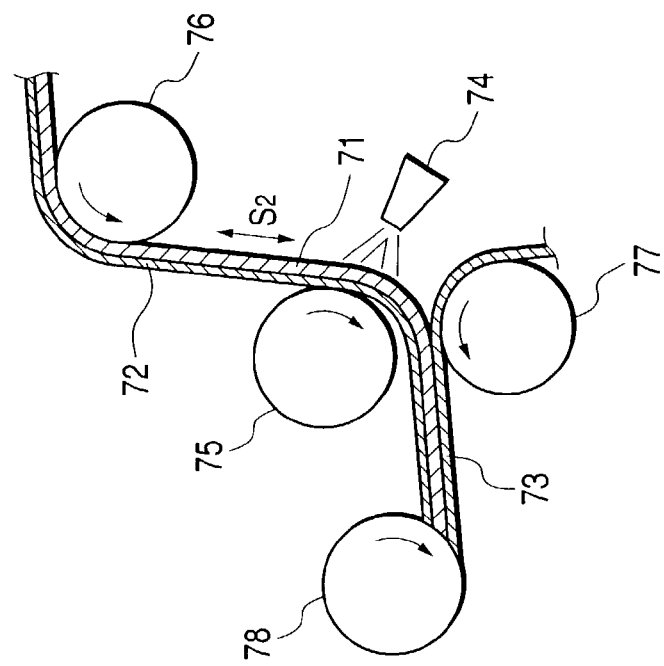
FIGS. 7A and 7B are diagrammatic sectional views to illustrate another developer quantity control blade manufacturing process of the present invention.
Figure 7A:
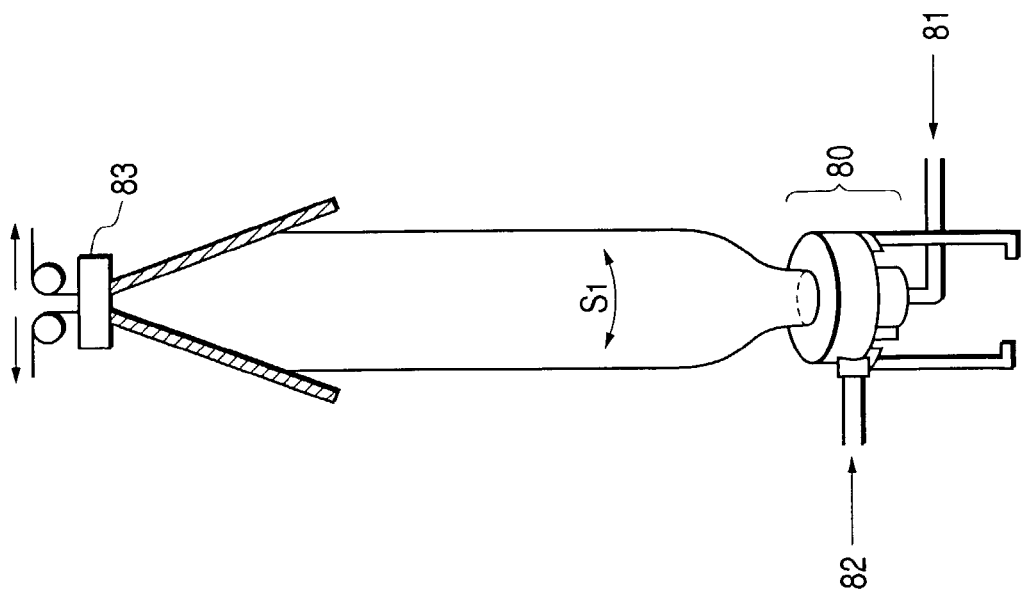

The blade member of each multi-layer sheet thus obtained and the support member may continuously be bonded together by means of an apparatus as shown in FIG. 7B. More specifically, a multi-layer sheet consisting of a blade member 71 and a face-transferring sheet 72 is fed to a roll 75 via a roll 76, and an adhesive is coated by a spray coater 74 on the blade member 71 on its side to which the support member is to be bonded. Thereafter, feeding a support member 73 through a roll 77, the support member 73 is bonded to the blade member 71, and the laminate thus obtained is wound up on a roll 78.

The method utilizing the multi-layer blown-film extrusion as described above is effective where a thin face-transferring sheet and a thick blade member must be used and any developer quantity control blade can not be manufactured by the method in which the face-transferring sheet and the blade member are prepared individually and then laminated. The use of the thin face-transferring sheet and thin blade member enables manufacturing costs to be reduced.

Stated specifically, the face-transferring sheet may preferably have a thickness of 1 µm or more, more preferably 10 µm or more, and still more preferably 50 µm or more, and on the other hand, a thickness of 200 µm or less. Also, the blade member may preferably have a thickness of 1 µm or more, and more preferably 10 µm or more, which may have even a thickness of 50 µm or more, and on the other hand, may preferably have a thickness of 100 µm or less, and more preferably 50 µm or less.

The total thickness of the multi-layer sheet may preferably be the sum of the face-transferring sheet thickness described above and the blade member thickness described above, e.g., preferably from 2 µm or more and 300 µm or less.

In the case when the multi-layer blown-film extrusion is employed, differently from the roll coating, the blade member molten resin comes into contact with not the face-transferring sheet itself but the face-transferring sheet molten resin. In this case, when the blade member molten resin solidifies to come to the blade member, the face-transferring sheet molten resin also solidifies. It, however, is considered that the necessary flatness of the charge control face of the blade member can be achieved by the action of a face-transferring sheet in a semi-molten state.

In the case of the multi-layer blown-film extrusion, too, the flatness (as Rz, preferably 3.5 µm or less, more preferably 1.0 µm or less, and still more preferably 0.3 µm or less) necessary for the charge control face can be achieved with ease.

For the fine structure of the charge control face, it is also important to be smooth. Even if its roughness is measured as a relatively large numerical value in a macroscopic view, the charge control face may suffice as long as it is smooth in a microscopic view. More specifically, even if it has a macroscopic roughness of 2 to 4 µm, a satisfactory effect is expected under a roughness profile having a relatively large amplitude, as long as it has a roughness of 0.5 µm or less, preferably 0.4 µm or less, and more preferably 0.3 µm or less, in its fine structure.

The face-transferring sheet is peeled before the developer quantity control blade is used, and hence it is preferable for the face-transferring sheet and the blade member to have good releasability. From such a viewpoint, the resin for the face-transferring sheet is preferably a straight-chain high polymer containing no polar group, and the resin for the blade member is preferably a high polymer containing a polar group.

As the straight-chain high polymer containing no polar group, an olefinic high polymer is preferred. As the high polymer containing a polar group, a polyamide high polymer is preferred.

In order to improve the releasability of the face-transferring sheet and blade member, a tack-reducing agent such as air, an inert gas or a gas containing tack-free fine particles may further be ejected to the space between the face-transferring sheet molten resin and the blade member molten resin when they are co-extruded from the circular die, as long as the effect attributable to the face-transferring sheet does not become insufficient.

Figure 2A:
FIGS. 2A, 2B and 2C are diagrammatic views to illustrate the developer quantity control blade of the present invention.
Figure 2B:
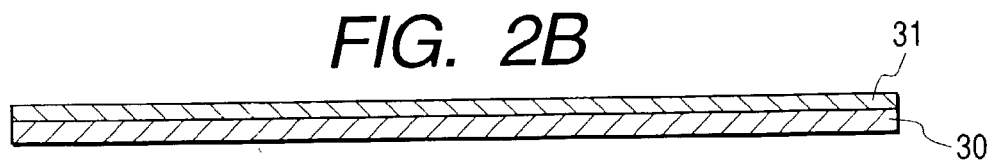
Figure 2C:
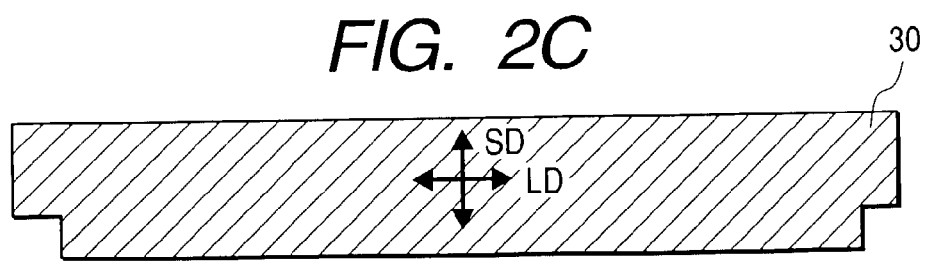

When the laminate consisting of the face-transferring sheet, the blade member and the support member, prepared as described above, is cut to have the shape of the developer quantity control blade, it may preferably be so cut that, as shown in FIG. 2C, the orientation direction SD of the blade member resin (resin for the blade member) lies substantially at right angles to the lengthwise direction LD of the blade member. In this case, the bond strength of the blade member and support member can be improved. Also, the blade member may be made to have the same shape as the support member as shown in FIGS. 2A to 2C and FIG. 3. This is more effective in improving the precision of pressure contact with the developer-carrying member, because the support member may deflect with difficulty at its part on which no blade member is formed, compared with the blade shown in FIG. 1.

The blade member resin may be oriented by sufficiently inflating the cylindrical body after the face-transferring sheet molten resin and the blade member molten resin have been co-extruded from the circular die. In this case, the orientation direction of the resin is the frost line direction S1 as shown in FIG. 7A. Accordingly, the cutting in the shape of the developer quantity control blade is so carried out that the lengthwise direction of the developer quantity control blade obtained is in parallel with the direction of making the laminate (i.e., extrusion direction).

The blade member resin may be sufficiently oriented by stretching the multi-layer sheet after the multi-layer sheet has been formed. In this case, the orientation direction of the resin is the orientation direction S2 as shown in FIG. 7B. Accordingly, the cutting into the shape of the developer quantity control blade is so carried out that the lengthwise direction of the developer quantity control blade obtained lies at right angles to the direction of making the laminate (i.e., stretch direction).

Before the multi-layer sheet and the support member are laminated, the blade member may be made rough-surface on its side to which the support member is to be bonded. This can improve the adherence between the blade member and the support member.

For example, the surface of the roll 76 coming into contact with the blade member 71 shown in FIG. 7B is made rough. In this case, the blade member can have a larger contact area surface on that side, and also, because of an anchor effect, a great adhesive force can be obtained between the blade member and the support member. From such a viewpoint, the rough surface may preferably have a ten-point average roughness (Rz) of 1.5 µm or more.

The rough surface of that roll may be formed by embossing with various types of patterns, or by scratch patterning. Such a surface may be obtained by etching or mechanical surface-roughening. Also, it is preferable to avoid any surface-roughening that may affect the surface properties of the blade member on the side of the face-transferring sheet (charge control face), and the rough surface may preferably have a ten-point average roughness (Rz) of 5.0 µm or less.

Such a rough-surface roll is not necessarily required to be metallic, and any heat-resistant material may suffice. For example, it is effective to use a silicone rubber roll subjected to surface-roughening treatment. A ceramic material may also be used, which may be provided with a reinforcing coating on its surface if there is concern about brittleness.

The blade member and the support member which have been bonded together may be heated to achieve much higher adherence.

It is preferred that the face-transferring sheet of the developer quantity control blade thus manufactured is not peeled until the developer quantity control blade is attached to the preset position of the developing assembly, in order that the developer quantity control blade covered with the face-transferring sheet can be stored and transported as a part (an article for sale). Here, the face-transferring sheet serves as a protective sheet of the developer quantity control blade.

Figure 3:
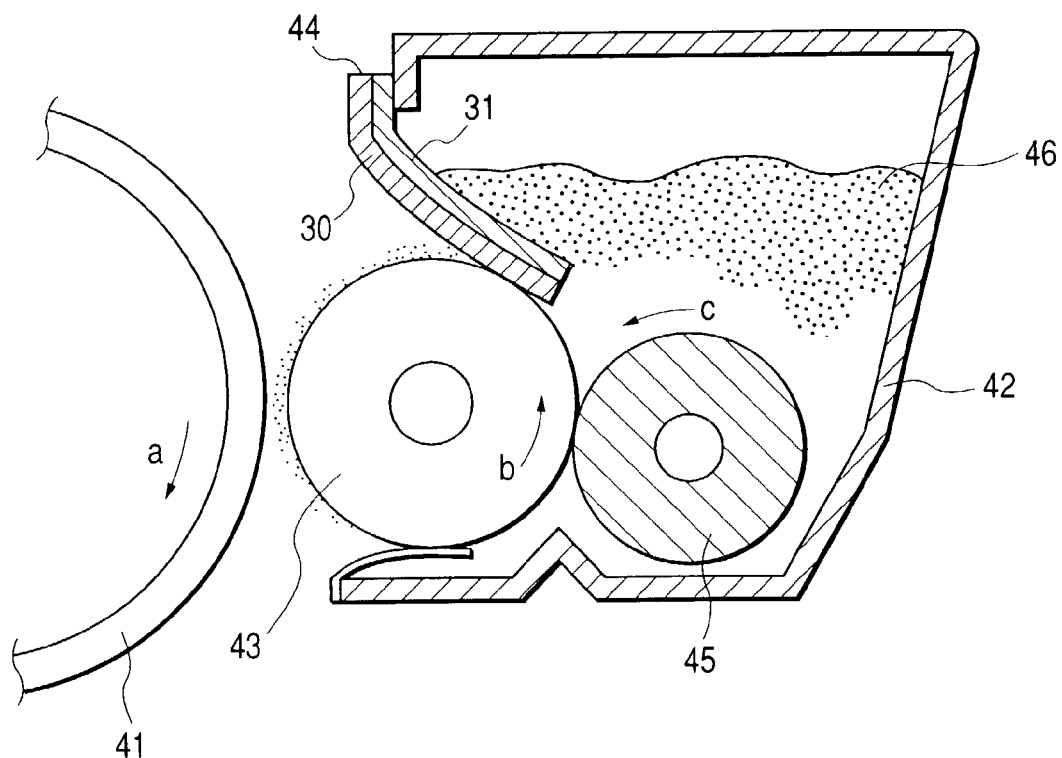
FIG. 3 is a diagrammatic sectional view to illustrate a developing assembly.

An example of a developing assembly making use of the developer quantity control blade according to the present invention is shown in FIG. 3. Reference numeral 42 denotes a developer container holding therein, e.g., a one-component developer 46. This developing assembly has, inside the developer container 42, a developing sleeve serving as a developer-carrying member 43 which is provided opposite to an image-bearing member (electrophotographic photosensitive member) 41 rotatable in the direction of an arrow a shown in the drawing and develops an electrostatic latent image on the electrophotographic photosensitive member 41 to render it visible as a toner image. The developer-carrying member 43 is rotatively laterally provided in such a manner that it is thrust into the developer container 42 by substantially the right half of its periphery as viewed in the drawing, and is exposed to the outside of the developer container 42 by substantially the left half of its periphery. A minute gap is provided between the developer-carrying member 43 and the electrophotographic photosensitive member 41. The developer-carrying member 43 is rotated in the direction of an arrow b against the rotational direction a of the electrophotographic photosensitive member 41.

Inside the developer container 42, a developer quantity control blade 44 according to the present invention is provided at the upper position of the developer-carrying member (developing sleeve) 43. An elastic roller 45 is also provided on the upstream side relative to a blade member 30 in the rotational direction of the developing sleeve 43.

The developer quantity control blade 44 is so provided as to be inclined in the downward direction toward the upstream side in the rotational direction of the developing sleeve 43, and is brought into touch with the upper periphery of the developing sleeve 43 against its rotational direction.

The elastic roller 45 is provided in contact with the developing sleeve 43 at its part opposite to the electrophotographic photosensitive member 41, and is rotatively supported.

In the developing assembly constructed as described above, the elastic roller 45 is rotated in the direction of an arrow c to carry a toner 46 and feed it to the vicinity of the developing sleeve 43 as the elastic roller 45 is rotated. The toner 46 carried on the elastic roller 45 is rubbed against the surface of the developing sleeve 43 at a contact zone (nip) where the developing sleeve 43 and the elastic roller 45 come into contact, so that the toner adheres to the surface of the developing sleeve 43.

Thereafter, with the rotation of the developing sleeve 43, the toner 46 having adhered to the surface of the developing sleeve 43 gets into the contact zone between the developer quantity control blade 44 and the developing sleeve 43, and is rubbed with both the surface of the developing sleeve 43 and the blade member 30 when passed there, so that the toner is sufficiently triboelectrically charged.

The toner thus charged gets through the contact zone between the blade member 30 and the developing sleeve 43, so that a thin layer of the toner is formed on the developing sleeve 43, and is transported to the developing zone where the sleeve 43 faces the electrophotographic photosensitive member 41 leaving a minute gap. Then, between the developing sleeve 43 and the electrophotographic photosensitive member 41 at the developing zone, an alternating voltage formed by superimposing an alternating current on a direct current, for example, is applied as a development bias, and the toner 46 carried on the developing sleeve 43 is transferred to the electrophotographic photosensitive member 41 correspondingly to the electrostatic latent image to adhere to the electrostatic latent image and develop it, so that it is rendered visible as a toner image.

The toner 46 not consumed in the development at the developing zone and having remained on the developing sleeve 43 is collected into the developer container 42 at the lower part of the developing sleeve 43 as the developing sleeve 43 is rotated.

The toner 46 collected is scraped off by the elastic roller 45 from the surface of the developing sleeve 43 at the contact zone between the elastic roller 45 and the developing sleeve 43. At the same time, as the elastic roller 45 is rotated, the toner 46 is fed anew onto the developing sleeve 43, and the new toner 46 is again transported to the contact zone between the developing sleeve 43 and the blade member 30.

The greater part of the toner 46 scraped off is, as the elastic roller 45 is rotated, mixed with the toner 46 remaining in the developer container 42, where the triboelectric charges of the toner scraped off are dispersed.

In order to make proper the strength of the touch of the blade with the developer-carrying member such as the developing sleeve, it is preferable to analyze the properties of the developer quantity control blade in the state it is actually used. Accordingly, apparent Young's modulus Ea of the developer quantity control blade is measured with, e.g., an instrument as shown in FIG. 8.

Figure 8:
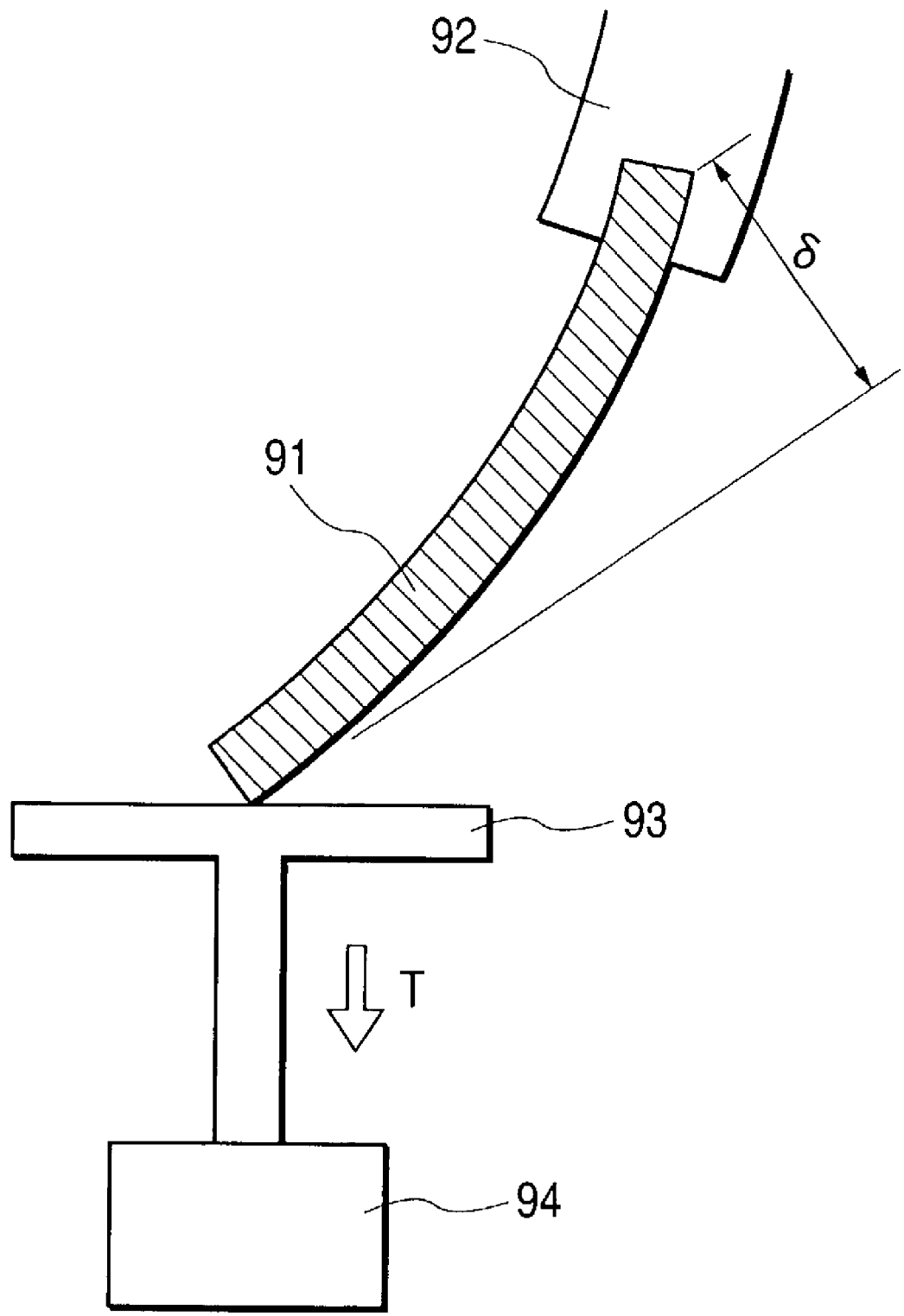
FIG. 8 is a diagrammatic sectional view to illustrate an instrument for evaluating the properties of the developer quantity control blade.

As shown in FIG. 8, a developer quantity control blade 91 is fastened at its one-side end with a chuck 92 so that the state the blade is fastened to the developer container can be reproduced. At the other end, it is brought into touch with a stage 93 so that the state the developer quantity control blade 91 is brought into counter touch with the developer-carrying member can be reproduced. Now, the chuck is moved so as to reproduce the state the developer quantity control blade 91 is disposed in the developing assembly and used, causing the developer quantity control blade 91 to bend in a deflection of δ (mm). Also, touching force T (kN) applied to the stage is measured with a detector 94. Then, the apparent Young's modulus Ea (kN/mm$^2$) is calculated from the theory of a thin-sheet cantilever spring, on the basis of the values of the lengthwise length (mm), width (mm) and thickness (mm) of the developer quantity control blade 91 in addition to the deflection δ (mm) and touching force T (kN).

The apparent Young's modulus Ea (kN/mm$^2$) thus measured is considered to reflect the properties of a developer quantity control blade held in the state the developer quantity control blade is actually disposed in the developing assembly.

Stated specifically, when measured while setting the touching force T at 0.49 N, the apparent Young's modulus Ea may preferably be 140 kN/mm$^2$ or more, and more preferably 150 kN/mm$^2$ or more, and on the other hand, may preferably be 170 kN/mm$^2$ or less, and more preferably 160 kN/mm$^2$ or less.

As long as the apparent Young's modulus Ea is 140 kN/mm$^2$ or more, sufficient triboelectric charging of the developer can be achieved and the developer can be prevented from slipping through. Also, as long as the apparent Young's modulus Ea is 170 kN/mm$^2$ or less, the appropriate pressure touch of the developer quantity control blade with the developer-carrying member can be achieved, the quantity of the developer to be transported can be controlled within a suitable range, and high-grade images can be formed. Durability of the developer quantity control blade and developer-carrying member can also be improved.

Figure 4:
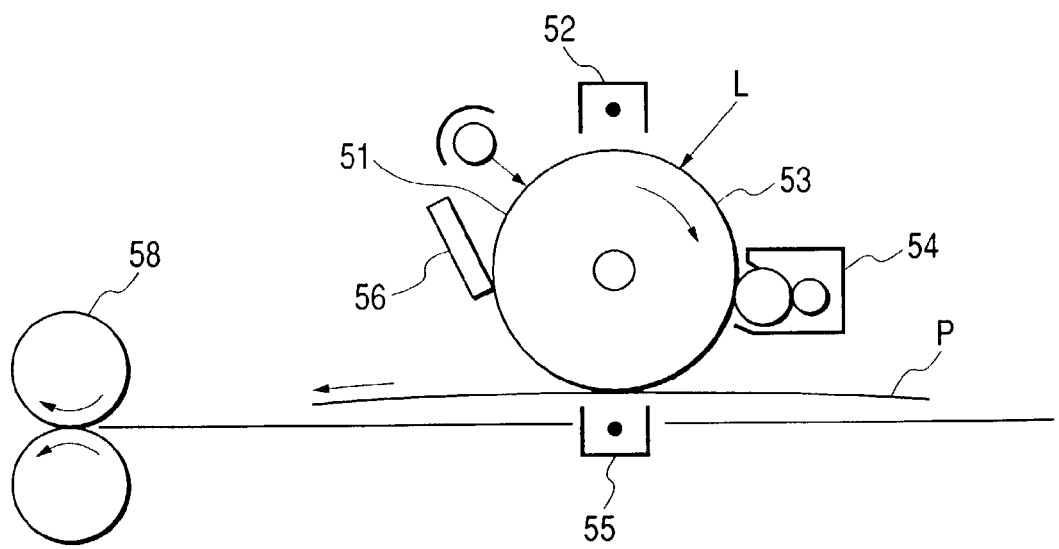
FIG. 4 is a diagrammatic sectional view to illustrate an electrophotographic apparatus.

An example of an electrophotographic apparatus suited for employing a developing assembly having the developer quantity control blade according to the present invention is shown in FIG. 4. Reference numeral 51 denotes a photosensitive member serving as the image-bearing member. In this example, a drum type electrophotographic photosensitive member is used which is constituted basically of a conductive support made of aluminum or the like and a photosensitive layer formed on its periphery. It is rotatively driven around an axis in the clockwise direction as viewed in the drawing, and at a stated peripheral speed.

A charging means 52 is a corona charging assembly which is in contact with the surface of the photosensitive member 51 and primarily uniformly charges the photosensitive member surface in a stated polarity and potential. This may also be a charging roller.

The photosensitive member thus charged uniformly by the charging means is then exposed to light of intended image information by an exposure means L (laser beam scanning exposure or original-image slit exposure), and electrostatic latent images 53 corresponding to the intended image information are formed on the periphery of the photosensitive member.

The electrostatic latent images thus formed are subsequently developed as toner images by means of a developing assembly 54. The toner images thus formed are then successively transferred by the operation of a transfer means 55 to the surface of a transfer material P fed from a paper feed section to a transfer zone between the photosensitive member 51 and the transfer means 55 in the manner synchronized with the rotation of the photosensitive member 51.

The transfer means 55 in this example is a corona discharger (or may be of a roller type), which charges the transfer material P on its back in a polarity reverse to that of the toner, whereupon the toner images on the side of the photosensitive member 51 surface are transferred onto the surface of the transfer material P. In a color LBP (laser beam printer) which reproduces color images by using four color toners, latent images are developed with each color toner to be made visible, the toner images are first transferred to an intermediate transfer member such as a roller or a belt, then transferred onto the surface of the transfer material P.

The transfer material P to which the toner images have been transferred is separated from the surface of the photosensitive member 51, forwarded to heat fixing rolls 58, where the toner images are fixed, and then put out of the apparatus as an image-formed material.

From the surface of the photosensitive member 51 from which toner images have been transferred, removal of adherent contaminants such as transfer residual toner is effected through a cleaning means 56. Thus the photosensitive member is cleaned on its surface, and then repeatedly used for image formation.

A plurality of components of the electrophotographic apparatus, such as the photosensitive member, the charging means, the developing assembly and the cleaning means, may integrally be incorporated in a process cartridge so that the process cartridge is detachably mountable on the body of the electrophotographic apparatus. For example, the photosensitive member and the developing assembly, optionally together with the charging means and the cleaning means, may integrally be incorporated in a process cartridge so as to be detachably mountable through a guide means such as rails installed in the body of the apparatus.

The electrophotographic apparatus in which the developing assembly having the developer quantity control blade according to the present invention is usable may include copying machines, laser beam printers, LED printers, and apparatus where electrophotography is applied, such as electrophotographic lithography or engraving systems.

EXAMPLES

The present invention is described below in greater detail by giving Examples. The present invention is by no means limited to the following Examples.

In the following, unless particularly noted, "part(s)" and "%" refer to "part(s) by weight" and "% by weight", respectively. As reagents and so forth, commercially available high-purity products are used.

Examples 1 to 4

As a material for the blade member, a polyamide elastomer (trade name: DAIAMID PAE E40-S3; available from Daicel-Huels Ltd.) was melted at 250° C. The molten product obtained was so extruded onto a face-transferring sheet (polyethylene terephthalate film of 0.1 mm in thickness and 0.2 µm in surface roughness Rz, produced by extrusion) that its thickness came to be 0.1 mm, 0.2 mm or 0.3 mm after solidifying, and a sheet-like laminate of 0.2 mm, 0.3 mm or 0.4 mm in total thickness was produced by roll coating.

To this sheet-like laminate, a phosphor bronze sheet of 0.12 mm or 0.15 mm in sheet thickness was bonded by providing between them an adhesive layer comprised of ADCOAT AD-76P1 (trade name), available from Toyo Moton K.K., to form a laminate, which was then press-cut in a prescribed blade size. Thus, developer quantity control blades shown in Table 1 were produced. Here, each developer quantity control blade was 200 mm in length and 23 mm in width.

The face-transferring sheet was peeled and the surface roughness Rz (ten-point average roughness) of the charge control face of the unused blade member was also measured with a SURFCORDER SE3500 (trade name), manufactured by Kosaka Laboratory Ltd., to find that it was 0.2 µm.

Each of the developer quantity control blades thus produced, having the shape shown in FIGS. 2A to 2C, and a developing sleeve obtained by blasting an aluminum pipe to have a ten-point average roughness Rz of 2.5 µm were fitted to a developing assembly so that the pressure touch between the developer quantity control blade and the developing sleeve was at a pressure of 0.18 N/cm. To the developer container, a sponge roller made of foamed urethane was fitted as an elastic roller which applies a toner onto the developing sleeve and also acts to scrape off any toner having remained without being used in development and return it again to the developer container. A non-magnetic toner was put into the developer container.

The developing assembly thus set up was fitted to a laser beam printer (trade name: LASER SHOT; manufactured by CANON INC.) in a low-temperature and low-humidity environment of 15° C./10% RH and the developing sleeve was driven, where the coating state of the toner on the developing sleeve was observed to visually examine whether or not any lines or unevenness were seen. As a result, the toner was found to have been coated in a good state.

Charge quantity (triboelectricity) of the toner was also measured. As a method of evaluating the triboelectric chargeability of the charge control face of the developer quantity control blade, the following method was employed. The developer quantity control blade and the developing sleeve were fitted to the developing assembly and the developing sleeve was rotated to transport the toner, the developer held in the developer container. The toner was provided with electric charges by triboelectric charging with the developer quantity control blade, and the toner having electric charges was uniformly applied onto the developing sleeve. From the values of charge quantity (Q) and mass (M) found by suction of this toner, toner charge quantity per unit mass, Q/M (µC/g), was calculated. This toner charge quantity Q/M is suited for evaluating the triboelectric chargeability because a difference in numerical value is produced depending on the triboelectric charging performance of the charge control face of the developer quantity control blade. The results are shown in Table 1.

Image density of solid black images reproduced on paper by the use of a non-magnetic black toner was further measured with a Macbeth densitometer as solid black density, so that the images were good without lines and unevenness. The results are shown in Table 1.

TABLE 1

|  | Example | | | |
|---|---|---|---|---|
|  | 1 | 2 | 3 | 4 |
| Blade member thickness: (mm) | 0.1 | 0.2 | 0.3 | 0.1 |
| Support member thickness: (mm) | 0.15 | 0.12 | 0.15 | 0.12 |
| Surface roughness Rz: (µm) | 0.2 | 0.2 | 0.2 | 0.2 |
| Triboelectricity: (µC/g) | −23 | −22 | −22 | −22 |
| Solid black density: | 1.4 | 1.5 | 1.5 | 1.5 |

A developer quantity control blade was produced in the same manner as in Example 1 except that the blade member was formed in a thickness of 30 µm. Using this blade, the performance equal to or higher than that in Example 1 was achievable.

Examples 5 and 6

Developer quantity control blades were produced in the same manner as in Example 1 except that, as face-transferring sheets, polypropylene film of 0.1 mm in thickness and 0.5 µm in surface roughness Rz (Example 5) and polyethylene terephthalate film of 0.12 mm in thickness and 0.5 µm in surface roughness Rz (Example 6) were used. Evaluation was made in the same way as in Example 1. The results are shown in Table 2. In addition, referring to the solid black image output, good images without lines and unevenness were obtained.

TABLE 2

|  | Example | |
|---|---|---|
|  | 5 | 6 |
| Surface roughness Rz: (µm) | 0.5 | 0.5 |
| Triboelectricity: (µC/g) | −23 | −23 |
| Solid black density: | 1.4 | 1.5 |

As can be seen from Table 2, in addition to the shape of the developer quantity control blade, the surface roughness Rz of the charge control face influences the performance of the developer quantity control blade.

Where the blade member was formed in a thickness of 30 µm, the performance was more improved.

Examples 7 to 9

As a material for the blade member, a polyamide elastomer (trade name: DAIAMID PAE E40-S3; available from Daicel-Huels Ltd.) was melted at 250° C. The molten product obtained was so extruded onto a face-transferring sheet (polypropylene film of 0.1 mm in thickness and 0.2 µm in surface roughness Rz, produced by extrusion) that its thickness came to be 0.15 mm after solidifying, and a sheet-like laminate of 0.25 mm in total thickness was produced by roll coating.

Here, as the roll with which the polyamide elastomer came into contact, a roller having a surface roughness Rz of 1.5 µm (Example 7), 3.0 µm (Example 8) or 5.0 µm (Example 9) was used. As a result, the polyamide elastomer layer of the sheet-like laminate obtained had a surface roughness Rz of 1.0 µm (Example 7), 2.5 µm (Example 8) or 4.0 µm (Example 9).

To this sheet-like laminate, a phosphor bronze sheet of 0.15 mm in sheet thickness was bonded by providing between them an adhesive layer comprised of ADCOAT AD-76P1 (trade name), available from Toyo Moton K.K., to form a laminate, which was then press-cut in a prescribed blade size. Thus, developer quantity control blades shown in Table 3 were produced. Here, each developer quantity control blade was 200 mm in length and 5 mm in width.

The face-transferring sheet was peeled and the surface roughness Rz (ten-point average roughness) of the charge control face of the unused blade member was also measured with a SURFCORDER SE3500 (trade name), manufactured by Kosaka Laboratory Ltd., to find that it was 0.2 µm.

Performances of the developer quantity control blades thus produced were evaluated in the same manner as in Example 1. The results are shown in Table 3.

TABLE 3

|  | Example | | |
|---|---|---|---|
|  | 7 | 8 | 9 |
| Surface roughness Rz of rough-surface roll: (µm) | 1.5 | 3.0 | 5.0 |
| Surface roughness Rz of adhesive surface: (µm) | 1.0 | 2.5 | 4.0 |
| Triboelectricity: (µC/g) | −23 | −23 | −23 |
| Solid black density: | 1.4 | 1.5 | 1.4 |

As can be seen from Table 3, surface-roughening the blade member on the side to which the support member is to be bonded can achieve sufficient adherence between the blade member and the support member.

Where the blade member was formed in a thickness of 30 µm, the performance was more improved.

Example 10

As a resin for the blade member, a polyamide elastomer (trade name: DAIAMID PAE E40-S3; available from Daicel-Huels Ltd.) was melted at 250° C. As a resin for the face-transferring sheet, polypropylene (trade name: UBE POLYPRO J309GL; available from Ube Industries, Ltd.) was melted at 180° C. These were co-extruded to carry out double-layer blown-film extrusion using the apparatus shown in FIGS. 6 and 7A, in such a way that the polypropylene came to be the outer layer of the cylindrical product. Also, the polyamide elastomer layer was so formed as to have a thickness of 50 µm after solidifying, the polypropylene layer was so formed as to have a thickness of 50 µm after solidifying, and the cylindrical product formed of these was cut open in two sheets to obtain double-layer sheets.

The double-layer sheets thus obtained were stretched. To each sheet thus stretched, a phosphor bronze sheet of 0.12 mm in sheet thickness was bonded by providing between them an adhesive layer comprised of ADCOAT AD-76P1 (trade name), available from Toyo Moton K.K., to form a laminate. Here, the adhesive surface of the blade member had a surface roughness Rz of 0.5 µm.

The laminate thus obtained was so press-cut that its lengthwise direction fell at right angles to the stretch direction to obtain a developer quantity control blade shown in Table 4. Here, the developer quantity control blade was 200 mm in length and 5 mm in width.

The face-transferring sheet was peeled and the surface roughness Rz (ten-point average roughness) of the charge control face of the unused blade member was also measured with a SURFCORDER SE3500 (trade name), manufactured by Kosaka Laboratory Ltd., to find that it was 0.5 μm. Also, the face-transferring sheet was well peelable.

Performance of the developer quantity control blade thus produced was evaluated in the same manner as in Example 1. The results are shown in Table 4.

Example 11

A developer quantity control blade was produced in the same manner as in Example 10 except that the polypropylene layer was in a thickness of 80 μm after solidifying and, in the double-layer sheet obtained, the polyamide elastomer layer was surface-roughened with the roller (surface roughness Rz: 2.5 μm) on its side not coming into contact with the polypropylene layer. Evaluation was made in the same way. Here, the adhesive surface of the blade member had a surface roughness Rz of 2.5 μm. The results are shown in Table 4.

Example 12

A developer quantity control blade was produced in the same manner as in Example 10 except that the polypropylene layer was in a thickness of 150 μm after solidifying and, in the double-layer sheet obtained, the polyamide elastomer layer was surface-roughened with the roller (surface roughness Rz: 2.0 μm) on its side not coming into contact with the polypropylene layer. Evaluation was made in the same way. Here, the adhesive surface of the blade member had a surface roughness Rz of 2.0 μm. The results are shown in Table 4.

Example 13

A developer quantity control blade was produced in the same manner as in Example 12 except that the polyamide elastomer layer was in a thickness of 100 μm after solidifying and the polypropylene layer was in a thickness of 100 μm after solidifying. Evaluation was made in the same way. Here, the adhesive surface of the blade member had a surface roughness Rz of 2.0 μm. The results are shown in Table 4.

TABLE 4

|  | Example | | | |
| --- | --- | --- | --- | --- |
|  | 10 | 11 | 12 | 13 |
| Blade member thickness: (μm) | 50 | 50 | 50 | 100 |
| Face-transferring sheet thickness: (μm) | 50 | 80 | 150 | 100 |
| Surface roughness Rz of adhesive surface: (μm) | 0.5 | 2.5 | 2.0 | 2.0 |
| Triboelectricity: (μC/g) | −23 | −23 | −22 | −23 |
| Solid black density: | 1.4 | 1.5 | 1.4 | 1.4 |

As can be seen from Table 4, a high-performance developer quantity control blade can be produced by producing the blade member by multi-layer blown-film extrusion.

Where the blade member was formed in a thickness of 30 μm, the performance was more improved.

Example 14

A developer quantity control blade was produced in the same manner as in Example 10 except that, at the time of co-extrusion, air of 50° C. was upward blown through the space between the polyamide elastomer layer and the polypropylene layer. Evaluation was made in the same way. Here, the adhesive surface of the blade member had a surface roughness Rz of 0.5 μm, and the face-transferring sheet showed an especially good releasability. The results are shown in Table 5.

Example 15

A developer quantity control blade was produced in the same manner as in Example 11 except that, at the time of co-extrusion, nitrogen gas of 50° C. was upward blown through the space between the polyamide elastomer layer and the polypropylene layer and that the polypropylene layer was formed to have a thickness of 50 μm after solidifying. Evaluation was made in the same way. Here, the adhesive surface of the blade member had a surface roughness Rz of 2.5 μm, and the face-transferring sheet showed an especially good releasability. The results are shown in Table 5.

TABLE 5

|  | Example | |
| --- | --- | --- |
|  | 14 | 15 |
| Blade member thickness: (μm) | 50 | 50 |
| Face-transferring sheet thickness: (μm) | 50 | 50 |
| Surface roughness Rz of adhesive surface: (μm) | 0.5 | 2.5 |
| Triboelectricity: (μC/g) | −23 | −23 |
| Solid black density: | 1.4 | 1.5 |

As can be seen from Table 5, the face-transferring sheet can be improved in releasability by blowing a tuck-reducing agent through the space between the face-transferring sheet layer and the blade member layer at the time of co-extrusion.

Where the blade member was formed in a thickness of 30 μm, the performance was more improved.

Example 16

A developer quantity control blade was produced in the same manner as in Example 1 except that, as a face-transferring sheet, a polypropylene film produced by extrusion and being 0.1 mm in thickness and 0.5 μm in surface roughness Rz was used and that the width of the developer quantity control blade was changed to 23 mm. Evaluation was made in the same way. The apparent Young's modulus Ea as measured at a touching force of 0.49 N was 154 kN/mm$^2$, and the same performance as that in Example 1 was ascertained. Also, where the blade member was formed in a thickness of 30 μm, the performance was more improved.

Example 17

A developer quantity control blade was produced in the same manner as in Example 2 except that, as a face-transferring sheet, a polypropylene film produced by extrusion and being 0.1 mm in thickness and 0.2 µm in surface roughness Rz was used and that the width of the developer quantity control blade was changed to 23 mm. Evaluation was made in the same way. The apparent Young's modulus Ea as measured at a touching force of 0.49 N was 162 kN/mm², and the same performance as that in Example 2 was ascertained. Also, where the blade member was formed in a thickness of 30 µm, the performance was more improved.

What is claimed is:

1. A process for manufacturing a developer quantity control blade which controls a quantity of a developer carried out of a developer container through a developer-carrying member, the developer quantity control blade comprising a blade member having a charge control face and a supporting member laminated on the blade member, having an apparent Young's modulus Ea in a range of 140 kN/mm² to 160 kN/mm², the process comprising the steps of:
   (i) extruding a material for a blade member onto a charge control face face-transferring resin sheet with a uniform thickness, a fine structure of the charge control face face-transferring resin sheet having a surface such that a macroscopic roughness profile of the surface is in the range of 2 µm to 4 µm and a microscopic roughness profile of the surface is 0.5 µm or less;
   (ii) solidifying the extruded material on the face-transferring resin sheet to form the blade member having a thickness in a range of 1 µm to 300 µm;
   (iii) laminating the supporting member to the blade member, the supporting member having a thickness in a range of 50 µm to 150 µm; and
   (iv) cutting the blade member and the supporting member, which have been laminated, into the shape of a developer quantity control blade as a final shape.

2. The process according to claim 1, wherein the face-transferring sheet is not peeled in the course of the manufacturing process.

3. The process according to claim 1, further comprising a step of peeling the face-transferring resin sheet from the blade member resulting from step (iii) or step (iv).

4. The process according to claim 1, wherein a total thickness of the developer quantity control blade has a thickness in a range of 51 µm to 450 µm.

* * * * *

UNITED STATES PATENT AND TRADEMARK OFFICE
CERTIFICATE OF CORRECTION

PATENT NO. : 7,074,292 B2
APPLICATION NO. : 10/251853
DATED : July 11, 2006
INVENTOR(S) : Toru Ishigaki et al.

It is certified that error appears in the above-identified patent and that said Letters Patent is hereby corrected as shown below:

ON THE TITLE PAGE
    At Item (56), References Cited, Foreign Patent Documents, "2001255738" should read --2001-255738--.

COLUMN 1
    Line 64, "stick to," should read --to stick to--.

COLUMN 2
    Lines 19-23, should be deleted.

COLUMN 10
    Line 11, "the" should read --a--;
    Line 12, "state" should read --state wherein--; and
    Line 14, "state" should read --state wherein--.

COLUMN 16
    Line 8, "upward blown" should read --blown upwardly--; and
    Line 20, "upward blown" should read --blown upwardly--.

Signed and Sealed this

Twenty-seventh Day of March, 2007

JON W. DUDAS
*Director of the United States Patent and Trademark Office*